Sept. 6, 1949.  R. W. PHELPS  2,480,957
PORTABLE POWER-DRIVEN RECIPROCATING SAW
Filed March 7, 1946  3 Sheets-Sheet 1
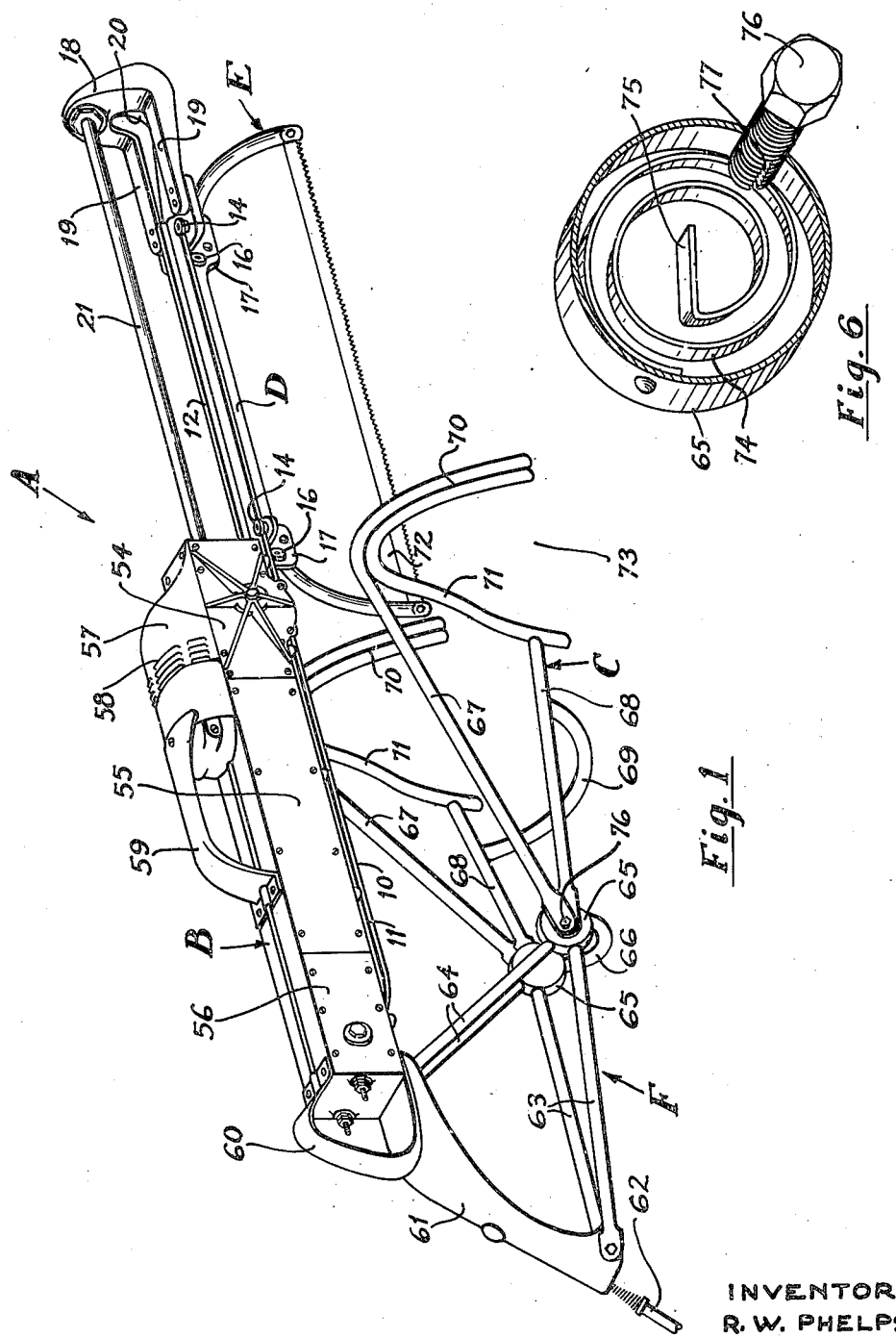
INVENTOR
R. W. PHELPS
By: Fetherstonhaugh & Co.
ATT'YS

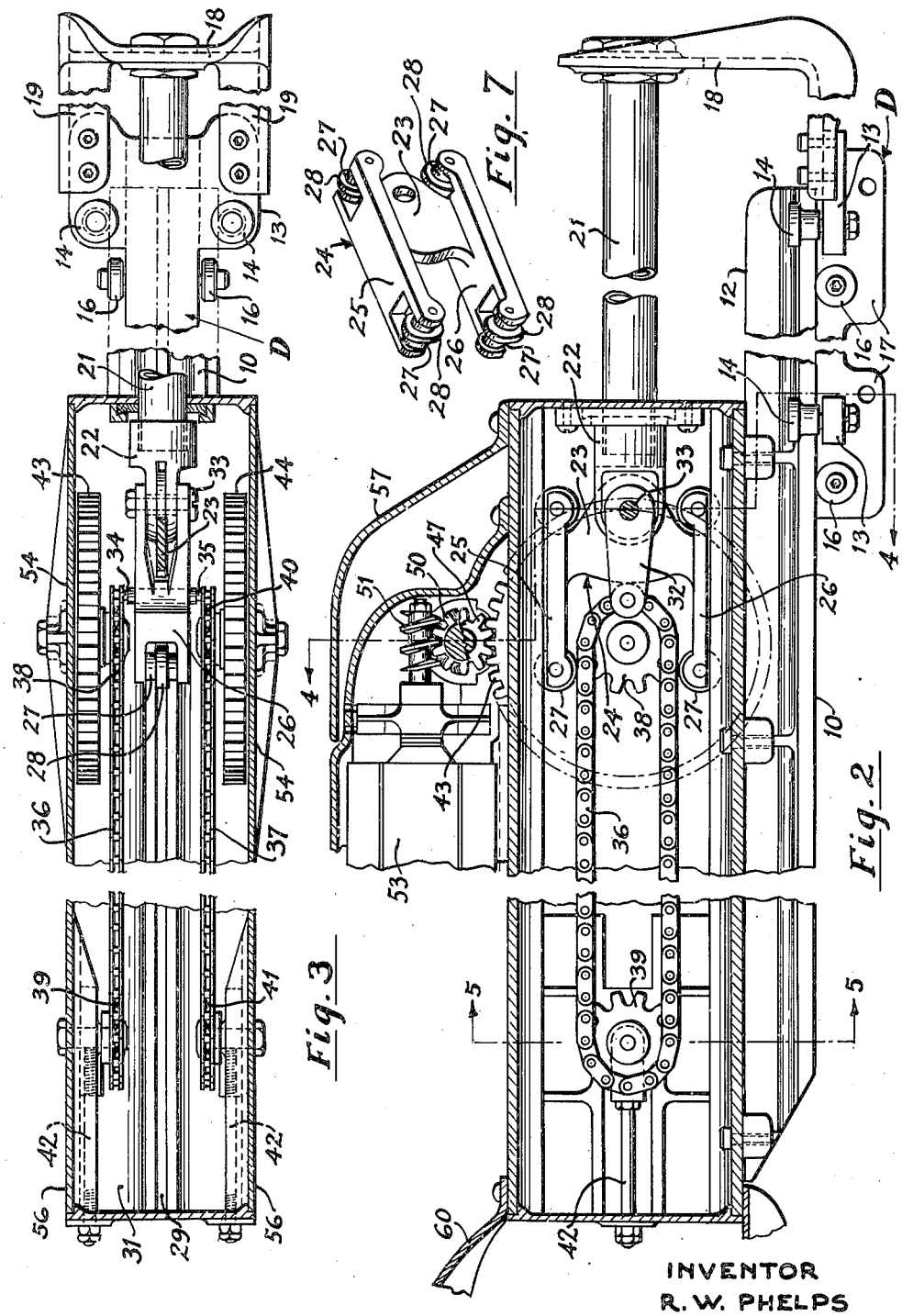

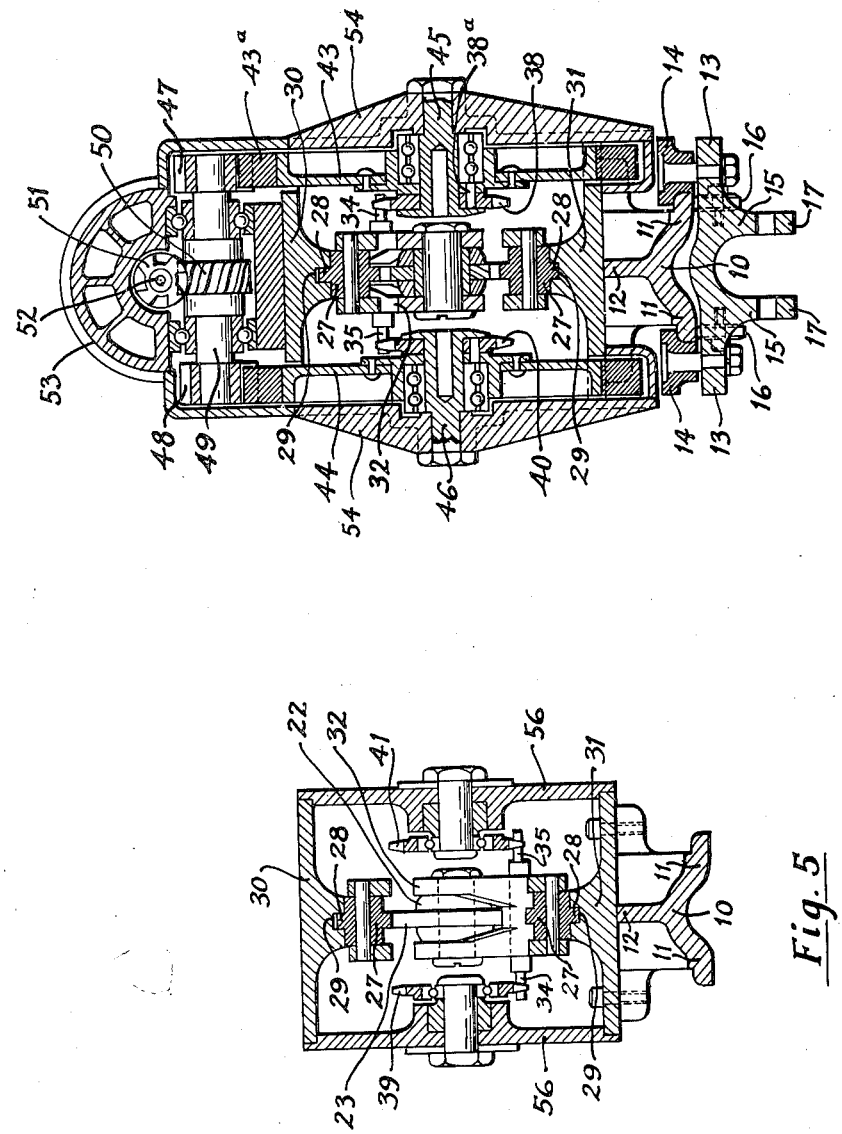

Patented Sept. 6, 1949

2,480,957

UNITED STATES PATENT OFFICE 2,480,957

PORTABLE POWER-DRIVEN RECIPROCATING SAW

Ross W. Phelps, Orillia, Ontario, Canada

Application March 7, 1946, Serial No. 652,571

4 Claims. (Cl. 143—68)

This invention relates to portable power saws.

Portable power saws have previously been proposed and designed for the cutting of timber. These units, however, have generally been relatively heavy and not well balanced and, therefore, inconvenient and hard to manipulate with facility. Moreover, the parts have been complicated and the construction somewhat cumbersome so that in the event of failure of any of the parts for the unit, they have been difficult to repair.

The present invention seeks to avoid these and other disadvantages of the prior proposals in this field.

It is an object of the present invention to provide a comparatively light and well balanced saw which will be readily portable and can be handled by one man.

A further object of the invention is to provide a saw which is generally simple in construction, which will operate smoothly and efficiently and may be powered from any suitable source.

A further object of the invention is to provide a unit of this kind provided with a simple mounting structure designed to engage logs, timber and the like to maintain the saw in proper position during operation and in which the saw mounting is movable relatively to the mounting structure readily to perform the sawing operation.

A further object of the invention is to provide a unit of this kind which will operate smoothly and will avoid any substantial vibration. A still further object of the invention is to provide a device of this character wherein the parts are arranged so that the saw may be taken apart for the replacement of parts in a simple manner and wherein various parts may be removed in convenient groups.

A still further object of the invention is to provide a saw which can be manufactured at a relatively low cost.

With these and other objects in view, the invention generally comprises an elongated body containing the driving mechanism for the saw, a saw carriage guide underlying the body and projecting from one end thereof, a reciprocable saw carriage slidably mountable on said guideway, and a mounting unit swingably carried on said housing designed to position the saw on timber and the like and to maintain the saw in position during the cutting operation. Preferably, the operating means includes an endless element designed to cause a uniform and smooth reciprocation of the saw, a motor element within the housing for driving the actuating parts, and a means of mounting cooperating parts in conjunction with sectional parts of the casing.

The invention will be fully understood by reference to the following detailed specification taken in conjunction with the accompanying drawings.

In the drawing,

Fig. 1 is a perspective view of a preferred form of portable power saw according to the present invention.

Fig. 2 is an enlarged fragmentary section taken longitudinally through the housing of the saw unit and illustrating more clearly the structure and arrangements of the parts.

Fig. 3 is an enlarged fragmentary top plan view of the saw with the top of the housing removed to show the arrangement of the mechanism therewithin.

Fig. 4 is a transverse section taken on the line 4—4 of Fig. 2.

Fig. 5 is an enlarged transverse section taken on the line 5—5 of Fig. 2.

Fig. 6 is an enlarged perspective detail of a type of spring and bolt which may be employed for connecting the housing to the mounting unit under spring pressure; and Fig. 7 is a perspective detail of the sliding guide yoke operating within the carriage.

Referring to the drawings, A indicates a portable power saw according to the present invention which includes a main housing B designed to be carried by a mounting and positioning unit C. The housing B is designed to contain the actuating parts for the saw and underlying the housing is a guide 10 having laterally projecting guide rails 11 (Fig. 4) which project laterally from a central web 12 and in spaced relation to the housing B. The guide is designed to project beyond the forward end of the housing as clearly shown in Figs. 1 and 2.

A saw carriage D is designed to be slidably mounted on the guide 10. This carriage, as best seen in cross section in Fig. 4, takes the form of an elongated element having the laterally projecting flanges 13 carrying the shouldered rollers 14 rotatable about a vertical axis and designed to overlap the edges of the rails 11 slidably to mount the carriage on the rails. The saw carriage also has the spaced apart vertically extending flanges 15 designed to carry the rollers 16 disposed on horizontal axes, the rollers being designed to engage the base of the rails 11; thus to maintain the saw carriage in set slidable relation to the guide 10. The flanges 15 of the saw carriage are extended downwardly at each end in the form of lugs 17 which are orificed and designed to provide the means for securing the saw E to the carriage. Thus, the saw is designed to reciprocate below the guide 10 and substantially throughout the length of this guide.

At the forward end, the saw carriage is provided with a head 18 which is bifurcated to form the spaced apart parallel arms 19 and the forward recess 20 so that during reciprocation of the carriage the head 18 will, in effect, straddle the central web 12 of the guide 10.

The head 18 forms the means of connecting the saw carriage with the reciprocating means carried within the housing B. This is effected by means of the link rod 21 rigidly connected to the head 18 at one end and designed to pass through a suitable bearing in the forward end of the housing. Within the housing the link rod 21 terminates in a connecting head 22 which is designed pivotally to connect with the central web portion 23 of a sliding guide yoke 24.

The guide yoke is formed with the horizontally extending arms 25 and 26 which are rigidly connected in spaced apart relation by the web 23. The opposite ends of the arms 25 and 26 are bifurcated and designed to receive the guide rollers 27 which are preferably formed with a circumferentially projecting, central guide flange 28 designed to enter into the guide channels 29 of the upper and lower, horizontal, longitudinally extending internal guides 30 and 31 respectively. The rollers 27 are preferably of suitable composition, such as Bakelite, as is also the case with the outer saw carriage guide rollers 14 and 16.

The head 22 pivotally connects with the web portion 23 of the guide yoke 24 by means of the bifurcated link 32, pivotally connecting with the head 22 as at 33 and pivotally connected by means of the laterally projecting pins 34 and 35 (see Fig. 3) with the parallel spaced apart drive chains 36 and 37. The chains 36 and 37 are endless chains, each running over the sprockets 38 and 39, and 40 and 41, respectively. The sprockets 39 and 41 are idler guide sprockets and are adjustable for the purposes of tightening the chain where necessary and by means of the adjusting rods 42. The sprockets 38 and 40 are driven sprockets, driven, as clearly indicated in Figs. 3 and 4, by the gears 43 and 44, respectively. Shear pins 38a are provided to offset overload on the driving mechanism. These gears are mounted on the stub shafts 45 and 46 carried by the casing and preferably are formed with the circumferential gear rings 43a of "Bakelite" or similar material, designed to mesh respectively with the spur gears 47 and 48 carried at opposite ends on the driving shaft 49. This shaft is driven through the worm wheel 50 and worm 51, the former being carried on shaft 49 and the latter being carried on the drive shaft 52 of the motor 53. In the present illustration, the motor 53 is shown as an electrical motor, which is preferred, although other modes of power might be employed.

Upon rotation of the motor, it will be clear that through the gear train described, the driving sprockets 38 and 40 are caused to rotate and consequently the endless chains 36 and 37 are caused to travel throughout their complete circuit around the sprockets 38 and 39, and 40 and 41 respectively. Consequently, since the link 32 is pivotally connected to the chains 36 and 37, it will be caused to make the complete circuit. As a result, therefore, the link rod 21 is reciprocated and firmly guided during the reciprocation by means of the guide yoke 24 and its arms 25 and 26 which dispose the guide rollers 27 in the track guideways 29. This eliminates any tendency towards unwarranted vibration and provides for an extremely smooth reciprocating stroke which is contributed to by the guide rolls 14 and 16 operating in conjunction with the saw carriage D and guide rails 11.

A reference to Fig. 1, in particular, taken in conjunction with Figs. 4 and 5, will illustrate the fact that the housing is formed in a plurality of separable sections such as the side plates 54, 55 and 56 so that the gears 43 and 44 and their connected sprockets 38 and 40 are readily removable with the side plates 54, the guide sprockets 39 and 41 readily removable with the plates 56, whereas the bottom plates are easily removable, carrying the guide tracks, so that in the case of maintenance and repair, it is a simple matter to remove the necessary plates with the attached operating mechanism.

The motor is readily housed within a removable casing 57 preferably provided with the ventilating louvres 58 and a handle 59 is conveniently positioned between the top of the motor casing 57 and the top of the casing B. A second handle 60 is carried at the end of the casing B and rests upon an end support 61 formed to carry the electrical conduit 62 when the motive power is electrical.

A supporting structure is designed to be connected with the support 61 preferably in the form of the framework F composed of the pairs of brace bars 63 and 64 extending from the support 61 at an angle thereto and connected at the opposite ends by the hubs 65 which in turn are rigidly held in spaced apart relation by a transversely extending U-link or the like 66. The hubs 65 form the pivotal mounting for the positioning unit C which may be composed of the pairs of links 67 and 68, each pair in turn pivotally mounted on one of the spaced apart hubs 65; and the links 68 are held, towards their outer ends, in rigid spaced apart relation by a suitable U-link 69.

The outer ends of the links 67 and 68 are designed to connect with the log straddling elements 70 of substantially inverted V-shaped form, one section of which is slightly inwardly curved as at 71 to form a narrow receiving space 72 for smaller logs, the straddling elements being graduated finally to terminate in a wide mouth 73 designed to embrace larger logs, trees, etc.

Each pair of links 67 and 68 is under spring tension which may be effected by incorporating within the hubs 65 a convolute spring 74, one end 75 being in operative connection with the links such as by the connecting bolt 76 slotted as at 77 to engage the end 75 of the spring. Consequently, the casing B may be downwardly depressed to cause the saw E to cut through the log, etc., held by the straddling means 70 and when the cutting operation has been completed, the spring will cause the casing and, of course, the saw carriage and saw to swing back to normal position.

It will be clearly understood from the foregoing that the present invention provides a portable, relatively simple but durable saw construction and which, due to the character of the construction, may be made up as a comparatively light unit subject to easy carrying and which can be handled conveniently by one man. Moreover, it is obvious that a smooth and even operation will result due to the manner in which the saw is carried and operated since the chain drive and guides, as well as the saw carriage and its guides, will produce a smooth and rhythmic operation. Obviously, the saw is easy of maintenance and replacement of parts due to the plate sections of the housing and the manner in which the parts are mounted relatively to these plate sections.

What I claim as my invention is:

1. A portable reciprocable saw comprising an elongated housing, a saw carriage guide underlying the housing and projecting from one end thereof, a reciprocable saw carriage slidably mounted on said guide, a saw blade, means for connecting said saw blade with said carriage for reciprocation with the latter, a pair of endless chains mounted in parallel laterally spaced relation within the housing, sprocket wheels operatively mounted within the casing carrying said chains, a link rod connected at one end to said carriage and having its other end projecting through an end wall of said housing, means for pivotally connecting said link rod with said chains, a guide yoke pivotally connected to said opposite end of the link rod, longitudinally extending guideways within the housing in spaced apart parallel relation, a plurality of rollers carried by said guide yoke and extending into said guideways, means for rotating said sprocket wheels to cause said chain to travel in an endless circuit to cause reciprocation of said saw blade, and means connected with said carriage engaging said guide for guiding said carriage during reciprocation.

2. A portable saw as claimed in claim 1 in which two of said sprocket wheels are drive sprocket wheels, and in which said means for rotating said sprocket wheels comprises a gear wheel connected to each of said drive sprocket wheels, a motor carried on said casing, and gear means operatively connecting between said motor and said gears for causing rotation of said sprocket wheels.

3. A portable reciprocable saw comprising, an elongated housing formed in a plurality of demountable parts, a saw carriage guideway underlying the housing and projecting from one end thereof, a reciprocable saw carriage slidably mounted on said guideway, a saw blade, means for connecting said saw blade with said carriage for reciprocation of the latter, two parallel endless chains within the housing, aligned spaced apart drive sprockets for driving said chains, idler sprockets spaced longitudinally from the driving sprockets designed to carry the opposite extremities of the chains, gears mounted on the drive sprockets and driving said drive sprockets, driving means engaging said gears for rotating said drive sprockets, means operatively connecting said carriage with said endless chains whereby to reciprocate said saw blade as said chains simultaneously travel through a complete cycle, each co-related pair of said drive sprockets and gears being journalled on a detachable section of said housing, said idler sprockets being rotatably mounted on other detachable sections of said casing whereby said idler sprockets, said drive sprockets, and said gears may be bodily removed from the housing by detaching a section of the latter.

4. A portable reciprocable saw as claimed in claim 1 in which the saw carriage guide is formed with laterally projecting flanges in spaced relation to the housing where said guide extends thereunder, and in which said guiding means connected with said carriage includes rollers extending from said carriage to engage the face of the flanges and rollers extending at substantially right angles to said first-mentioned rollers, said second-mentioned rollers engaging the edges of the flanges whereby smoothly to guide said carriage during reciprocation throughout the extent of its reciprocation stroke.

ROSS W. PHELPS.

REFERENCES CITED

The following references are of record in the file of this patent:

UNITED STATES PATENTS

| Number | Name | Date |
|---|---|---|
| 598,446 | Shettleworth | Feb. 1, 1898 |
| 757,770 | Richter | Apr. 19, 1904 |
| 775,247 | Reid | Nov. 15, 1904 |
| 910,145 | O'Hara | Jan. 19, 1909 |
| 925,553 | Barker | June 22, 1909 |
| 1,031,217 | Wear et al. | July 2, 1912 |
| 1,144,705 | Gralapp | June 29, 1915 |
| 1,173,824 | McKee | Feb. 29, 1916 |
| 1,302,770 | Crews et al. | May 6, 1919 |
| 1,400,496 | Bobbroff | Dec. 13, 1921 |
| 1,419,028 | Diers et al. | June 6, 1922 |
| 1,438,786 | Roberts | Dec. 12, 1922 |
| 1,588,892 | Humiston et al. | June 15, 1926 |
| 2,193,895 | Zielonka | Mar. 19, 1940 |
| 2,253,095 | Rothweiler | Aug. 19, 1941 |
| 2,346,724 | Briney | Apr. 18, 1944 |

FOREIGN PATENTS

| Number | Country | Date |
|---|---|---|
| 557,731 | France | May 9, 1923 |
| 514,371 | Germany | Dec. 11, 1930 |